United States Patent [19]

Holmberg

[11] 4,227,286
[45] Oct. 14, 1980

[54] STRAP TIGHTENER

[75] Inventor: Göte E. Y. Holmberg, Anderstorp, Sweden

[73] Assignee: Broderna Holmbergs Fabriks AB, Anderstorp, Sweden

[21] Appl. No.: 33,521

[22] Filed: Apr. 26, 1979

[30] Foreign Application Priority Data

Apr. 28, 1978 [SE] Sweden ............................. 7804911

[51] Int. Cl.$^2$ .......................... B25B 25/00; B66D 1/02
[52] U.S. Cl. ................................. 24/68 CD; 254/218; 410/103
[58] Field of Search ............. 24/68 CD, 68 R, 20 TT, 24/68 A, 68 F, 71.2; 105/477; 280/179 R, 179 A, 179 B; 254/79, 164, 73, 166

[56] References Cited

U.S. PATENT DOCUMENTS 3,804,368  4/1974  Bayley .................................. 105/477

FOREIGN PATENT DOCUMENTS 1423347  2/1976  United Kingdom ..................... 254/164
2006904  5/1979  United Kingdom ................. 24/68 CD Primary Examiner—Roy D. Frazier
Assistant Examiner—Alexander Grosz
Attorney, Agent, or Firm—Berman, Aisenberg & Platt

[57] ABSTRACT

A strap tightener including means to lock an operating lever in a rest position adjacent to an anchoring element for fixedly anchoring the strap tightener.

Said means include a hook projecting from a driving pawl on the operating lever for receiving, in the rest position of the operating lever, a holding pawl on the anchoring element.

6 Claims, 3 Drawing Figures

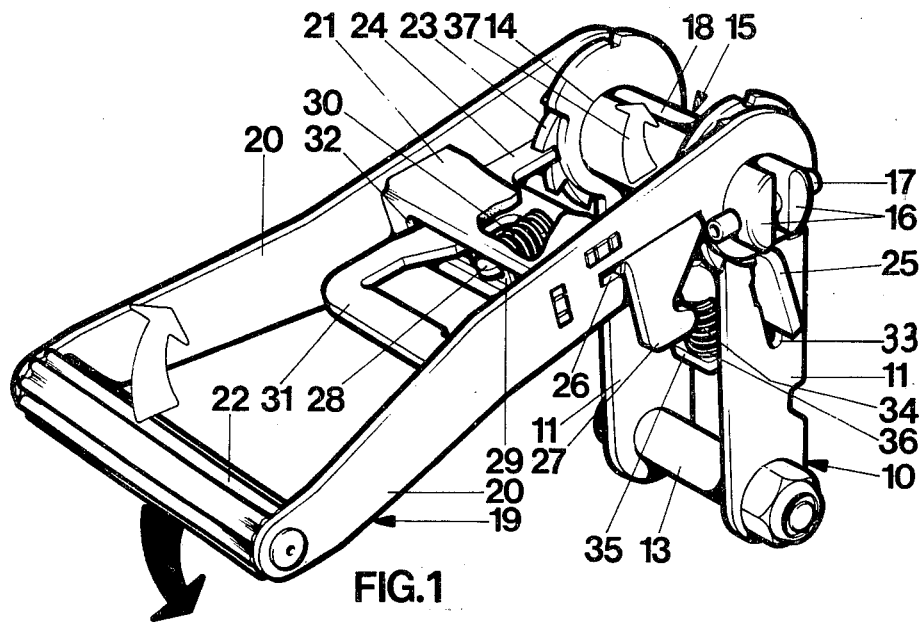
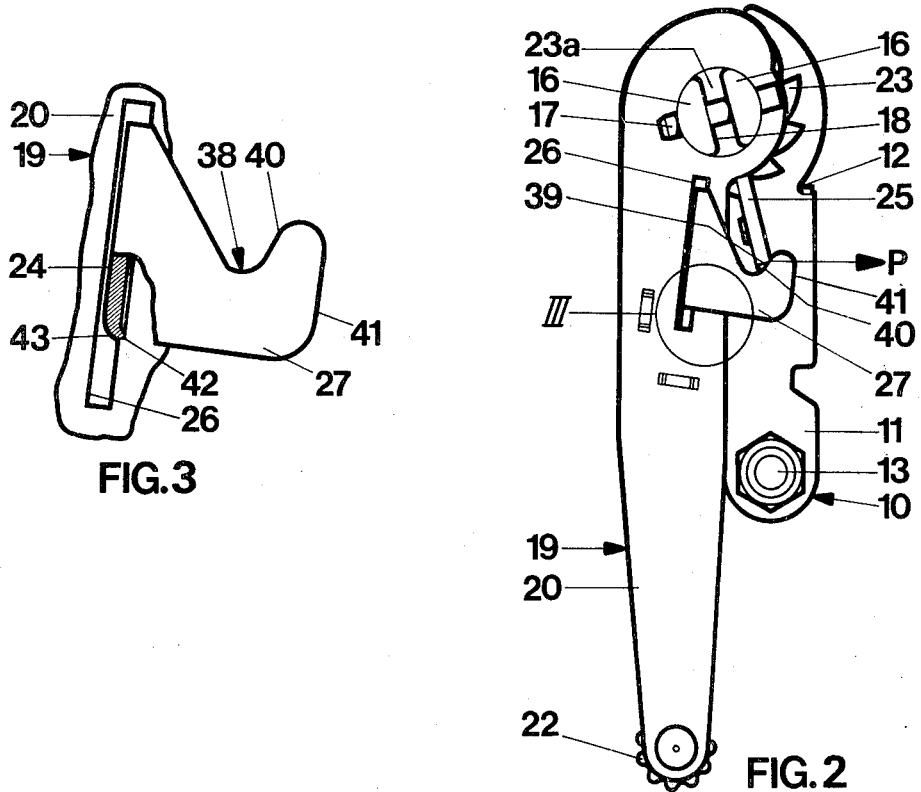

STRAP TIGHTENER

The invention relates to a strap tightener of the type which is used in tightening and securing a strap for lashing loads on trucks, comprising an element for fixedly anchoring the strap tightener, and operating lever pivoted to the anchoring element, a strap reel mounted coaxially with the pivot axis, at least one ratchet wheel non-rotatably connected to the strap reel, a holding pawl displaceably mounted to the anchoring element, which is spring-biased to engage the ratchet wheel, a driving pawl displaceably mounted to the operating lever, which is spring-biased to engage the ratchet wheel, the operating lever being drivingly connected to the strap reel by means of the driving pawl and the ratchet wheel when being swung in one direction, and being disengaged from the strap reel when being swung in the opposite direction, and means operatively connected to the driving pawl to lock the operating lever in a rest position adjacent to the anchoring element with the holding pawl locked in engagement with the ratchet wheel.

It is a safety requirement that a strap tightener of this type cannot release the strap when the truck is running, which could happen if the strap is exposed to a wrench and then yields back by resilience, which principally could be described as a type of "recoiling", and also if the holding pawl is displaced by inertia from the holding position thereof due to the fact that the truck bumps when passing irregularities in the roadway. Therefore, said means are provided for locking the operating lever in the rest position thereof while simultaneously locking the holding pawl in the engaged position thereof.

In a prior art embodiment of the strap tightener described above, which is available on the market the operating lever is locked in the rest position thereof by engaging the driving pawl with a notch in the anchoring element. In that case it is necessary to displace the driving pawl against the spring bias thereof in order to bring the operating lever to said locked position. As the operating lever is being swung to the rest position thereof adjacent to the anchoring element to be locked in this position, also the holding pawl is locked by a cam forming an integrated portion of the operating lever, which is brought to locking position over the holding pawl at the end thereof remote from the ratchet wheel.

The object of the present invention is to simplify the locking by providing the locking automatically without specific manipulation as the operating lever is being swung to the rest position thereof, and by locking the driving pawl and the holding pawl cooperating mutually, in the rest position engaged with each other and with the ratchet wheel such engagement being maintained also if the spring of the driving pawl per chance should give away, which in the prior art embodiment may imply that the operating lever will be free and can swing outwards with the result that also the locking of the holding pawl will be eliminated.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein a strap tightener of the kind initially referred to, wherein said means comprise a hook projecting from the driving pawl transversely of the path of movement thereof and open towards the pivot axis of the operating lever to receive, in the rest position of the operating lever, the holding pawl at the end thereof which is remote from the ratchet wheel said hook providing a force component transversely of the path of movement of the driving pawl by pressure applied to the holding pawl in a direction away from the ratchet wheel said force component acting towards the rest position of the operating lever.

In order to illustrate the invention an embodiment thereof will be described in more detail below, reference being made to the accompanying drawing in which FIG. 1 is a perspective view of an embodiment of the strap tightener according to the invention;

FIG. 2 is a side view of the strap tightener with the operating lever in rest position; and FIG. 3 is an enlarged fragmentary view, partly a sectional view, illustrating a detail of the strap tightener within the circle III in FIG. 2.

The strap tightener shown in the drawing comprises an anchoring element 10 made of metal sheet and having two limbs 11 and a web 12 interconnecting said limbs. A bolt 13 extends between the limbs at one end of the anchoring element, and a strap's end can be secured to said bolt for connecting the anchoring element to the platform body or the like where the strap tightener is to be used. Alternatively, the anchoring element can be mounted by means of screws or the like which pass through the web 12. At the other end of the anchoring element there is rotatably mounted in openings 14 a strap reel 15 consisting of two parts 16 interconnected and mutually spaced by means of cross pins 17 so that the strap reel 15 provides a through axial slot 18. The end of the strap to be tightened by means of the strap tightener when lashing a load on the platform body or the like can be inserted into said slot.

An operating lever 19 is pivoted at one end thereof on the strap reel 15. This operating lever consists of two limbs 20 rigidly interconnected by means of a riveted web 21 and a handle 22 riveted to the other end of the operating lever, said handle preferably being coated with rubber to provide an improved grip.

Two saw-toothed ratchet wheels 23 are threaded onto the strap reel 15 and are located between the limbs 11 of the anchoring element 10, said limbs being disposed on the inside of the ratchet wheels, and the limbs 20 of the operating lever 19, said limbs being disposed on the outside of the ratchet wheels. These two ratchet wheels are non-rotatably connected to the strap reel 15 by a diametrical portion 23a in the opening for the strap reel, passing through the slot 18. The two pins 17 located at the outside of the limbs 20 prevent axial withdrawal of the strap reel 15 from the position in the strap tightener.

A flat U-formed driving pawl 24 is mounted to the operating lever 19, and a flat U-formed holding pawl 25 is mounted to the anchoring element 10 both for cooperation with the ratchet wheels 23.

The driving pawl 24 engages the two ratchet wheels 23 at the ends of the limbs of the pawl and is guided in longitudinal slots 26 in the limbs 20. Flanges 27 on the pawl 24, forming an angle of 90° to the rest of the pawl, are located at the outside of the limbs 20 and are directed towards the edge of these limbs which is adjacent to the anchoring element 10. A tongue 28 formed on the driving pawl 24 passes through a support 29 in the web 21, and a helical compression spring 30 surrounding the tongue 28 is engaged between this support and the driving pawl 24, biasing the driving pawl to engage the ratchet wheels 23. A grip portion 31 formed on the driving pawl extends through an opening 32 in the web 21, and this grip portion can be gripped by two fingers of the hand embracing the handle 22 for displacing the driving pawl 24 against the bias of the spring 30 in order to disengage the driving pawl from the ratchet wheels 23.

The holding pawl 25 is displaceably guided in slots 33 in the limbs 11 of the anchoring element 10. A tongue 34 on the holding pawl passes through a lug 35 angled from the web 12, which forms a support for a helical compression spring 36 surrounding the tongue 34 and biasing the holding pawl to engage the ratchet wheels 23.

When a strap threaded through the slot 18 of the strap reel 15 is to be tightened by means of the strap tightener described, the operating lever 19 is pivoted up and down as indicated by the arrows in FIG. 1, the driving pawl 24 rotating the ratchet wheels 23 and thus the strap reel 15 in the direction of the arrow 37 when the operating lever 19 is being swung upwards while the holding pawl 25 slides over the teeth of the ratchet wheels 23 at the rotation thereof. When the operating lever 19 is being swung downwards the ratchet wheels 23 are prevented from rotating by the holding pawl 25 engaging the teeth of the ratchet wheels while the driving pawl 24 slides over the teeth without driving the ratchet wheels. In this respect the operation of the strap tightener described is the same as that of existing embodiments of strap tighteners of this type.

However, the operating lever 19 has a rest position in which it is located adjacent to the anchoring element 10, extending along said element, as shown in FIG. 2, and the operating lever shall be locked in this position the holding pawl 25 being locked simultaneously engaging the ratchet wheels 23. For this purpose the flanges 27 form a hook 38 open towards the pivot axis of the operating lever 19. When the operating lever 19 is being swung downwards to the position shown in FIG. 2, the driving pawl 24 is displaced against the bias of the spring 30 so that the hook 38 will clear the holding pawl 25 projecting at each side of the anchoring element 10, whereby the holding pawl can be received in the hook 38 at the edge 39 which is opposite to the edge engaging the ratchet wheels 23. Under the bias of the spring 30 the hook 38 will be pressed against the edge 39 at a marginal edge 40 thereof as shown in FIG. 2. It is not necessary to pull the grip portion 31 in order to engage the hook 38 with the holding pawl 25 in this manner if the position of the ratchet wheels 23 is such that the hook 38 is lifted over the holding pawl 25 by the driving pawl 24 sliding over the teeth of the ratchet wheels. However, the necessary movement of the driving pawl 24 can also be effected by forming the flanges 27 in such a manner that they are cammed aside by the edge 39 of the holding pawl 25 at the outer edge 41 of the hook.

The slots 26 and 33 guidingly receiving the driving pawl 24 and the holding pawl 25, respectively, are angularly adjusted to each other diverging from the pivot axis of the operating lever 19, said axis being the centre axis of the strap reel 15. The angle enclosed by the slots 26 and 33 preferably is of the order of 20 to 25°, and preferably the apex of the angle is located substantially on the centre axis of the strap reel 15.

If a force is applied to the holding pawl 25 against the bias of the spring 36 e.g. due to the "recoiling" initially referred to or due to bumping of the truck, when the operating lever 19 is in the rest position according to FIG. 2, the holding pawl will press against the edge surface 40 of the hook 38 at the edge 39. Due to the fact that the edge surface 40 is inclined to the path of movement of the holding pawl 25 but above all due to the fact that the paths of movement of the driving pawl 24 and the holdingpawl 25 are inclined to each other by the divergence of the slots 26 and 33 such pressure on the holding pawl 25 will provide a substantial pressure component P acting to press the driving pawl 24 to the right as seen in FIG. 2 while the pressure component acting in the longitudinal direction of the slots 26 and tending to displace the driving pawl 24 against the bias of the spring 30 will be substantially reduced as compared to the pressure component obtained if the slots 26 and 33 were substantially parallel to each other. The friction between the driving pawl and the limbs 20 in the slots 26 is increased thereby. These force conditions obtained by the specific geometry of the paths of movement of the driving pawl 24 and the holding pawl 25 combined with the interengagement between the holding pawl 25 and the hook 38 provide an effect locking of the two pawls engaging the ratchet wheels 23 the operating lever 19 simultaneously being locked in the rest position thereof by the hook 38 embracing the holding pawl 25. No specific step has to be taken for locking the operating lever 19 in the rest position and the holding pawl 25 in the engaging position thereof, because the hook 38 will engage automatically the holding pawl 25 when the operating lever 19 is being swung downwards to the rest position accordig to FIG. 2. The operating lever 19 is disengaged from the rest position by pulling the driving pawl 24 at the grip portion 31.

The locking can be improved by forming the slot 26 with a shoulder 42 engaged by a projection 43 provided by upsetting the edge of the driving pawl 24 such engagement being effected by the pressure component acting in the transverse direction of the slot 26 when the holding pawl 25 is pressing against the hook 38 as shown in FIG. 3. The interengagement of the shoulder 42 and the projection 43 does not prevent withdrawal of the driving pawl 24 against the bias of the spring 30 because there is provided a small tilting movement of the driving pawl 24, tending to disengage the projection 43 from the shoulder 42, when the grip portion 31 is being gripped.

The locking arrangement described has proved at tests to provide a very secure locking of the strap reel 15 and the operating lever 19 also without the separate interengagement of the driving pawl 24 and the limbs 20 at the shoulder 42 and the projection 43, and the strap tightener described also has proved to be very handy to operate because no specific manipulations are necessary for the locking.

It will be apparent to those skilled in the art that various other modifications and variations in addition to those mentioned above could be made in the strap tightener of the invention without departing from the scope and spirit of the invention.

I claim:

1. A strap tightener comprising an element for fixedly anchoring the strap tightener, an operating lever pivoted to the anchoring element, a strap reel mounted coaxially with the pivot axis, at least one ratchet wheel non-rotatably connected to the strap reel, a holding pawl displaceably mounted to the anchoring element, which is spring-biased to engage the ratchet wheel, a driving pawl displaceably mounted to the operating lever, which is spring-biased to engage the ratchet wheel, the operating lever being drivingly connected to the strap reel by means of the driving pawl and the ratchet wheel when being swung in one direction, and being disengaged from the strap reel when being swung in the opposite direction, and means operatively connected to the driving pawl to lock the operating lever in a rest position adjacent to the anchoring element with the holding pawl locked in engagement with the ratchet wheel, said means including a hook projecting from the driving pawl transversely of the path of movement thereof and open towards the pivot axis of the operating lever to receive, in the rest position of the operating lever, the holding pawl at the end thereof which is remote from the ratchet wheel said hook providing a force component transversely of the path of movement of the driving pawl by pressure applied to the holding pawl in a direction away from the ratchet wheel said force component acting towards the rest position of the operating lever.

2. A strap tightener according to claim 1 wherein the paths of movement of the holding pawl and the driving pawl are angularly adjusted to each other diverging from the pivot axis of the operation lever.

3. A strap tightener according to claim 2 wherein the angle of said paths is of the order of 20 to 25°.

4. A strap tightener according to claim 2 wherein the angle of said paths has the apex thereof substantially on the pivot axis of the operaing lever.

5. A strap tightener according to claim 1, further comprising an inclined surface on the hook for engagement with the holding pawl.

6. A strap tightener according to claim 1, further comprising a projection on the driving pawl and a shoulder in a guide slot for the driving pawl for engagement with said shoulder under the influence of said force component.

* * * * *